(12) United States Patent
Ristol et al.

(10) Patent No.: US 6,831,042 B2
(45) Date of Patent: Dec. 14, 2004

(54) USE OF ANIONIC DISPERSION POLYMERS AS VISCOSITY MODIFIERS IN AQUEOUS DRILLING FLUIDS

(75) Inventors: Guillem Solé Ristol, Barcelona (ES); Cathy C. Johnson, Geneva, IL (US)

(73) Assignee: Nalco Company, Naperville, IL (US)

( * ) Notice: Subject to any disclaimer, the term of this patent is extended or adjusted under 35 U.S.C. 154(b) by 30 days.

(21) Appl. No.: 10/173,253

(22) Filed: Jun. 17, 2002

(65) Prior Publication Data

US 2004/0005987 A1 Jan. 8, 2004

(51) Int. Cl.⁷ .................................................. C09K 7/02
(52) U.S. Cl. ........................ 507/120; 507/119; 507/121
(58) Field of Search ................................ 507/119, 120, 507/121

(56) References Cited

U.S. PATENT DOCUMENTS

| | | | |
|---|---|---|---|
| 3,323,603 A | | 6/1967 | Lummus et al. |
| 4,087,365 A | | 5/1978 | Clem |
| 4,293,427 A | * | 10/1981 | Lucas et al. ................. 507/121 |
| 4,499,214 A | * | 2/1985 | Sortwell ....................... 523/336 |
| 4,600,515 A | * | 7/1986 | Gleason et al. .............. 507/120 |
| 4,741,843 A | * | 5/1988 | Garvey et al. ............... 507/121 |
| 5,028,341 A | * | 7/1991 | Liao ............................ 507/120 |
| 5,208,216 A | | 5/1993 | Williamson et al. |
| 5,985,992 A | * | 11/1999 | Chen ........................... 524/814 |

\* cited by examiner

*Primary Examiner*—Philip C. Tucker
(74) *Attorney, Agent, or Firm*—Michael B. Martin; Thomas M. Breininger

(57) ABSTRACT

An aqueous drilling fluid used in drilling wells through subterranean formations having a pH of between about 7 and about 12 and a viscosity of from about 20 to about 80 sec (Marsch cone) which is prepared by admixing fresh water, brine or seawater with about 0.02 lb to about 2.5 lb per barrel, based on polymer actives, of one or more anionic dispersion polymers, wherein the anionic dispersion polymers are composed of about 2 to about 98 mole percent of one or more anionic monomers and from about 98 to about 2 mole percent of one or more nonionic monomers and wherein the anionic dispersion polymers have a RSV of from about 10 to about 50 dL/g, a method of drilling a well bore through a subterranean formation and a method of viscosifying an aqueous drilling fluid.

12 Claims, No Drawings

USE OF ANIONIC DISPERSION POLYMERS AS VISCOSITY MODIFIERS IN AQUEOUS DRILLING FLUIDS

TECHNICAL FIELD

This invention concerns aqueous drilling fluids containing anionic polymers. More particularly, this invention relates to a method of increasing the viscosity of aqueous drilling fluids using anionic dispersion polymers, to aqueous drilling fluids containing anionic dispersion polymers, and to use of the drilling fluids for drilling a well bore through a subterranean formation.

BACKGROUND OF THE INVENTION

In drilling wells for the recovery of oil, gas and water from subterranean formations, a drilling fluid or drilling mud is pumped down through a hollow drill pipe, across the face of the drill bit, and upward through the drill hole. The drilling mud serves to cool and lubricate the drill bit, to raise the drilling cutting to the surface and to seal the sides of the well to prevent loss of water and drilling fluid into the formation surrounding the drill hole. The drilling mud must have both proper viscosity and some degree of gelation to carry the drilled solids to the surface, over a screen to remove the large chips, and to remove sands in a settling basin.

In order to achieve the proper viscosity, various polymeric viscosifying agents may be added to the drilling fluid. The polymers act to increase the viscosity of the drilling fluid, thus forming a barrier between the rock formations and the vein of material being recovered. Polymers also help to increase the slipperiness of the drilling fluid and drilled ore and to lubricate the waste sludge. Polymers are also useful in the separation of the water, oil and waste solids after the drilling fluid is recovered from the well.

Polymeric viscosifiers used to date include latex polymers, where polymer solids are dispersed in a hydrocarbon solvent and stabilized with surfactants, dry polymers and solution polymers.

Disadvantages associated with latex polymers include the environmental unfriendliness of hydrocarbons and surfactants in case of spill or discharge on land or on an off shore platform and the potential fire hazards associated with the hydrocarbon solvent. Furthermore, environmental regulations in certain countries prohibit the injection of oil-containing polymers into subterranean formations below a specified depth. Latex polymers also must be inverted prior to use and the oil in water emulsion broken, which involves the use of additional surfactants.

Dry polymers are conventionally used drilling operations due to the high polymer concentration available in this form as compared to latex or solution polymers. However, dry polymers are typically very difficult to dissolve, requiring significant energy and water consumption to assure adequate makedown of the dry polymer into an active dilute form. Also, because of the difficulty associated with dissolution of the dry polymer, only very dilute solutions, typically less than 0.5 percent polymer product are prepared, thus significantly increasing water use requirements. In remote drilling locations both energy and water are often in short supply and require significant financial input to secure. Accordingly, there is an ongoing need for the development of environmentally friendly, safe and economical viscosity modifiers for drilling fluids.

SUMMARY OF THE INVENTION

In an aspect, this invention is a method of increasing the viscosity of an aqueous drilling fluid used in drilling wells through subterranean formations comprising adding to the drilling fluid an effective viscosity increasing amount of one or more anionic dispersion polymers, wherein the anionic dispersion polymers are composed of about 2 to about 98 mole percent of one or more anionic monomers and about 98 to about 2 mole percent of one or more nonionic monomers and wherein the anionic dispersion polymer has a RSV of about 10 to about 50 dL/g.

In another aspect, this invention is an aqueous drilling fluid used in drilling wells through subterranean formations having a pH of between about 7 and about 12 and a viscosity of from about 20 to about 80 sec (Marsch cone) which is prepared by admixing fresh water, brine or seawater with about 0.02 lb to about 2.5 lb per barrel, based on polymer actives, of one or more anionic dispersion polymers, wherein the anionic dispersion polymers are composed of about 2 to about 98 mole percent of one or more anionic monomers and from about 98 to about 2 mole percent of one or more nonionic monomers and wherein the anionic dispersion polymers have a RSV of from about 10 to about 50 dL/g.

In another aspect, this invention is a method of drilling a well bore through a subterranean formation comprising circulating through the well bore an aqueous drilling fluid having a pH of between about 7 and about 12 and a viscosity of from about 20 to about 80 sec (Marsch cone) which is prepared by admixing fresh water, brine or seawater with about 0.02 lb to about 2.5 lb per barrel, based on polymer actives, of one or more anionic dispersion polymers, wherein the anionic dispersion polymers are composed of about 2 to about 98 mole percent of one or more anionic monomers and from about 98 to about 2 mole percent of one or more nonionic monomers and wherein the anionic dispersion polymers have a RSV of from about 10 to about 50 dL/g.

The drilling fluid of this invention is prepared using water-based polymer compositions that contain neither organic solvents or surfactants, thereby resulting in a treatment system that addresses the environmental, safety and handling and economic concerns of industries utilizing such drilling processes.

Drilling fluids prepared using the anionic dispersion polymer of this invention do not flocculate the bentonite in bentonite-containing drilling muds and therefore have significantly increased useable life compared to bentonite-containing drilling fluids prepared from dry polymers of similar composition.

Also, when the anionic dispersion polymer of this invention is used to prepare bentonite-containing drilling muds, less bentonite is required to prepare a drilling mud having the same lifting characteristics as the corresponding composition prepared using dry polymers, resulting in increased drill bit life. This allows the end-user to realize cost savings relating to bentonite as well as the costs associated with less-frequent replacement of the drill bits.

DETAILED DESCRIPTION OF THE INVENTION

Definitions of Terms

"Anionic dispersion polymer" means an anionic water-soluble polymer dispersed in an aqueous continuous phase containing one or more inorganic salts. Representative examples of dispersion polymerization of water-soluble anionic monomers in an aqueous continuous phase can be found in U.S. Pat. Nos. 5,605,970; 5,837,776; 5,985,992; and 6,265,477 and PCT Application Number US01/10867, incorporated herein by reference.

Dispersion polymers are prepared by combining water, one or more inorganic salts, one or more water-soluble anionic and nonionic monomers, any polymerization additives such as chelants, pH buffers or chain transfer agents, and a water-soluble stabilizer polymer. In addition, further processing, structure modifying and/or stabilizing agents may be added to the mixture. All or a portion of this mixture is charged to a reactor equipped with a mixer, thermocouple, nitrogen purging tube, and water condenser. The solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. A portion of the reaction mixture containing any combination of the starting materials may be added in a semi-batch fashion during the course of the polymerization to improve processing or affect polymer composition or molecular weight. After this time, the products are cooled to room temperature, and any post-polymerization additives are charged to the reactor. Water continuous dispersions of water-soluble polymers are free flowing liquids with product viscosities of about 50 to about 10,000 centipoise (cP), as measured at low shear.

Inorganic salts suitable for preparing the anionic dispersion polymer include inorganic or organic sulfates, phosphates, chlorides, fluorides, citrates, acetates, tartrates, hydrogenphosphates or a mixture thereof. Preferred salts include ammonium sulfate, sodium sulfate, magnesium sulfate, aluminum sulfate, ammonium hydrogen phosphate, sodium hydrogen phosphate, potassium hydrogen phosphate, sodium chloride and ammonium chloride. The salts are used in aqueous solution typically having a combined total concentration of 15 weight percent or above in the product mixture.

Additional cationic salts may be used alone or in combination with the above inorganic salts for preparing anionic dispersion polymers. Preferred cationic salts include tetraalkylammonium halides having from 4 to 22 carbon atoms, substituted tetraalkylammonium halides having from 4 to 22 carbon atoms, aryl trialkylammonium halides having from 9 to 22 carbon atoms, and substituted aryl trialkylammonium halides having from 9 to 22 carbon atoms. Representative preferred cationic salts include cetylpyridinium chloride, cetylmethylammonium chloride and benzyltriethylammonium chloride.

Stabilizers used for preparing anionic dispersion polymers typically include anionically charged water soluble polymers having a molecular weight of from about 10,000 to about 10,000,000 and preferably from about 1,000,000 to about 3,000,000. The stabilizer polymer must be soluble or slightly soluble in the salt solution, and must be soluble in water. The stabilizer is used in an amount of from about 1 to about 20% by weight based on the total weight of the dispersion polymer.

Representative anionic stabilizers include, but are not limited to, polyacrylic acid, poly(meth)acrylic acid, poly(2-acrylamido-2-methyl-1-propanesulfonic acid), copolymers of 2-acrylamido-2-methyl-1-propanesulfonic acid and an anionic comonomer selected from acrylic acid and methacrylic acid, polymers of one or more anionic monomers and one or more nonionic monomers, and the sodium salts of the aforementioned anionic stablizers.

Nonionic stabilizer or dispersant components can also be used alone or in combination with the anionic stabilizers described herein for preparing anionic dispersion polymers. Representative nonionic components include, but are not limited to polyvinyl alcohol, polyvinyl pyrrolidinone, polyethylene glycol, polypropylene glycol, polyethylene oxide, polyethylene, soluble starch, epichlorohydrin/dimethylamine, poly(N-vinylpyridine), and the like.

Cationic stabilizer or dispersant components can also be used alone or in combination with the anionic and nonionic stabilizers described herein for preparing anionic dispersion polymers. Suitable cationic stabilizers include, but are not limited to, poly(diallyldimethylammonium chloride), poly (dimethylaminoethylacrylate methyl chloride quaternary salt), acrylamide/ dimethylaminoethyl acrylate benzyl chloride quaternary salt copolymer and diallyldimethylammonium chloride//dimethylaminoethyl acrylate benzyl chloride quaternary salt copolymer.

A multifunctional alcohol such as glycerin or ethylene glycol may also be included in the polymerization system. The formation of the fine particles is smoothly carried out in the presence of these alcohols.

The polymerization reaction is initiated by any means that results in generation of a suitable free radical. Initiation may be induced through the use of any number of conventional systems including thermal, photochemical, or redox coupled initiation systems. Thermally derived radicals, in which the radical species results from thermal, homolytic dissociation of a water-soluble azo, peroxide, hydroperoxide and perester compound are preferred. Especially preferred initiators are azo compounds including 2,2'-azobis(2-amidinopropane) dihydrochloride and 2,2'-azobis(N,N'-dimethyleneisobutylamine)hydrochloride, and the like.

A seed polymer may be added to the reaction mixture before the initiating polymerization of the monomers for the purpose of facilitating a fine dispersion of particles. The seed polymer is a water-soluble polymer insoluble in the aqueous solution of the polyvalent anionic salt. The monomer composition of the seed polymer need not be identical to that of the water-soluble polymer formed during polymerization. The seed polymer is preferably a polymer prepared by the dispersion polymer process described herein.

Since the dispersion polymers do not contain surfactants or oil, the dispersion polymers are environmentally friendly. Moreover, the absence of oil in the dispersion polymers equates to such polymers having virtually zero volatile organic content (VOC), and dramatically reduced biological oxygen demand (BOD), carbon oxygen demand (COD) and total organic carbon (COC) compared to conventional inverse emulsion polymers. This is another environmental advantage of such polymers.

"Anionic monomer" means a monomer as defined herein which possesses a net negative charge. Representative anionic monomers include (meth)acrylic acid, and it's salts, including, but not limited to acrylic acid, sodium acrylate, ammonium acrylate, methacrylic acid, sodium methacrylate, and ammonium methacrylate; 2-acrylamido-2-methylpropanesulfonic acid (AMPS) and its sodium salt; vinyl sulfonic acid and its salts including sodium vinyl sulfonate; styrene sulfonic acid and its salts; maleic acid and it's salts, including, but not limited to the sodium salt and ammonium salt; sulfopropyl acrylate or methacrylate or other water-soluble forms of these or other polymerisable carboxylic or sulphonic acids; sulfomethylated acrylamide; allyl sulfonate; itaconic acid, acrylamidomethylbutanoic acid; fumaric acid; vinylphosphonic acid; allylphosphonic acid, phosphonomethylated acrylamide, and the like.

"(Meth)acrylic acid" means acrylic acid or methacrylic acid or a salt thereof.

"(Meth)acrylamide" means acrylamide or methacrylamide.

"Monomer" means a polymerizable allylic, vinylic or acrylic compound. The monomer may be anionic, cationic or nonionic. Vinyl monomers are preferred, acrylic monomers are more preferred.

"Nonionic monomer" means a monomer as defined herein which is electrically neutral. Representative non-ionic, water-soluble monomers include acrylamide, methacrylamide, N-methylacrylamide, N,N-dimethylacrylamide, N,N-diethylacrylamide, N-isopropylacrylamide, N-vinylformamide, N-vinylmethylacetamide, dimethylhydroxypropyl (meth) acrylate, hydroxyethyl methacrylate, hydroxyethyl acrylate, hydroxypropyl acrylate, hydroxypropyl methacrylate, N-t-butylacrylamide, N-methylolacrylamide, vinyl acetate, acrylonitrile, 2-ethylhexyl acrylate, and the like.

"RSV" stands for Reduced Specific Viscosity. Within a series of polymer homologs which are substantially linear and well solvated, "reduced specific viscosity (RSV)" measurements for dilute polymer solutions are an indication of polymer chain length and average molecular weight according to Paul J. Flory, in *"Principles of Polymer Chemistry"*, Cornell University Press, Ithaca, N.Y., © 1953, Chapter VII, *"Determination of Molecular Weights"*, pp. 266–316. The RSV is measured at a given polymer concentration and temperature and calculated as follows:

$$RSV = \frac{[(\eta/\eta_o) - 1]}{c}$$

$\eta$=viscosity of polymer solution
$\eta_o$=viscosity of solvent at the same temperature
c=concentration of polymer in solution.

The units of concentration "c" are (grams/100 ml or g/deciliter). Therefore, the units of RSV are dl/g. In this patent application, a 1.0 molar sodium nitrate solution is used for measuring RSV. The polymer concentration in this solvent is measured at about 0.045 g/dL. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/gram. When two polymer homologs within a series have similar RSV's that is an indication that they have similar molecular weights.

Preferred Embodiments

Typical dispersions of anionic polymers of this invention have RSV's of from about 10 to about 50 and contain from about 10 to about 35 percent polymer actives.

The anionic polymers of this invention have a molecular weight of at least about 100,000, where the upper limit of the molecular weight is limited only by the solubility of the polymer in the drilling fluid. Preferred anionic polymers have a molecular weight of at least one million and more preferred polymers have a molecular weight of at least five million.

In a preferred aspect of this invention, the anionic dispersion polymer is composed of one or more anionic monomers and one or more nonionic monomers are selected from the group consisting of acrylamide and methacrylamide.

In another preferred aspect, the anionic monomers are selected from the group consisting of acrylic acid, methacrylic acid and 2-acrylamido-2-methylpropanesulfonic acid and the salts thereof.

In another preferred aspect, the dispersion polymer is acrylamide/acrylic acid copolymer.

In another preferred aspect, the dispersion polymer is composed of from about 2 to about 50 mole percent acrylic acid.

A drilling fluid according to this invention typically is composed of fresh water, brine or seawater and from about 0.02 lb to about 2.5 lb per barrel, preferably from about 0.12 lb to about 0.5 lb per barrel, based on polymer actives, of anionic dispersion polymer.

The aqueous drilling fluid preferably contains up to 10 percent by weight, preferably up to 5 percent and more preferably 4–5 percent by weight of clay.

Preferred clays include smectite clays such as montmorillonites (bentonite), as well as mixed layer types, attapulgite and sepiolite.

However, it is known that addition of acrylamide/acrylic acid polymers to bentonite-containing drilling muds can result in an initial rise in viscosity, followed by a subsequent drop in viscosity when additional polymer is added as a result of flocculation of the bentonite and native clays present in the formation. This flocculation can result in an increase in the gel strength of the fluid to such an extent as to not permit proper settling of bit cuttings, thereby reducing the effective life of the drilling fluid. This increase in gel strength has been compensated for to some extent by the addition of additional thinning agents such as caustic and quebracho and complex lignosulfates.

We have discovered that bentonite-containing drilling fluids prepared using anionic dispersion polymers do not flocculate the bentonite and therefore have significantly increased useable life compared to bentonite-containing drilling fluids prepared from dry polymers of similar composition while requiring reduced levels of thinning agents and the like.

We have also discovered that using anionic dispersion polymers permits the preparation of drilling fluids that require less bentonite than required to make a drilling fluid having the same lifting characteristics as the corresponding composition prepared using dry polymers. Reducing the amount of solids such as bentonite in the drilling mud results in increased drill bit life which in turn results in savings in the cost of the bits and further savings in labor to replace the bits since it is unnecessary to change bits so often. Reducing the amount of bentonite in the drilling fluid results in additional savings.

Drilling fluids of this invention have a pH of between about 7 and about 12, preferably between about 8.5 and about 10 and a viscosity of from about 20 to about 80 sec, preferably from about 40 to about 50 sec (Marsch cone).

The aqueous drilling fluid may contain other conventional additives including electrolytes, pH adjusting agents, lubricants, bactericides, breakers, iron control agents, foaming agents such as surfactants, gases or liquified gases, proppants, thinners, viscosifiers such as starch, modified starch, xanthan gum, hydroxyethyl cellulose polymer, and the like, weighting agents such as barites and haematite, and inorganic salts which aid in shale inhibition including sodium chloride, potassium chloride, calcium chloride, potassium carbonate, sodium acetate, calcium sulphate, and the like.

The drilling fluid is prepared by admixing the anionic dispersion polymer and any additional conventional drilling fluid additives in fresh water, brine or seawater.

The anionic dispersion polymer may be added directly to the drilling fluid, or preferably is diluted with fresh water, brine or seawater to a concentration of from about 0.02 lb to about 2.5 lb per barrel, preferably from about 0.12 lb to about 0.5 lb per barrel, based on polymer actives, prior to admixing with the drilling fluid. Because of the ease of handling and rapid dissolution of the polymer compared to a dry polymer product, makedown is accomplished quickly, reducing equipment and manpower costs associated with preparation of the drilling fluid. The rapid dissolution of the anionic dispersion polymer also facilitates incremental changes in the viscosity of the drilling fluid, which may be required by the nature of the particular drilling operation.

Use of the anionic dispersion polymers described herein also permits a substantial reduction in water consumption compared to the use of dry anionic polymer products, permitting the preparation of drilling fluids having a polymer concentration of up to 2.5 lb per barrel, based on polymer solids, while still affording an easily handled product.

The aqueous drilling fluid described herein may be used in any conventional drilling process in the same way as known aqueous drilling fluids. For example, in a typical drilling operation, drilling fluids are pumped down a hollow drill string, through nozzles in the bit at the bottom of the well, and back up the annulus formed by the hole or casing and drill string to the surface. Once reaching the surface, the drilling fluid is passed through a series of vibrating screens, settling tanks, hydrocyclones and centrifuges to remove formation debris brought to the surface. It is thereafter treated with additives to obtain the desired set of properties; pumped back into the well and the cycle is repeated.

The drilling fluid can be formulated in advance of actual drilling or alternatively, the anionic dispersion polymer can be added to the drilling fluid of a well in progress by injection into the mud circulation system at any one or more of several points, including, for example, the mud pump suction, hopper, mud suction pit, return line (prior to the drill solids removal system), the drill pipe, and the like.

The drilling fluid should be monitored by regular sampling and analysis to maintain an adequate concentration of polymer.

The foregoing may be better understood by reference to the following examples, which are presented for purposes of illustration and are not intended to limit the scope of this invention.

EXAMPLE 1

A 22.7% polymer solids, 70/30-mole percent acrylamide/acrylic dispersion polymer is synthesized in the following manner.

A 1500 cc reaction flask is fitted with a mechanical stirrer, thermocouple, condenser, nitrogen purge tube, an addition port and heating tape. To this reaction flask is added a solution prepared by combining 356.6 g of deionized water, 64 g sodium sulfate, 84 g ammonium sulfate, 2.8 g sodium formate, 85.0 g of a 16% aqueous solution of an anionic stabilizer polymer (available from Ondeo Nalco Company, Naperville, Ill.) 329.6 g of a 48.4% aqueous solution of acrylamide (available from Ondeo Nalco Company), 0.40 g of the tetrasodium salt of ethylene diamine tetracetic acid, 69.30 g acrylic acid (available from Rohm and Haas Texas, Inc., Deer Park, Tex.), and 4.0 g of a 50% aqueous solution of sodium hydroxide. The monomer reaction solution is heated to 35° C. with thorough mixing. To the homogenous monomer reaction solution is added 1.0 g of a 1% aqueous solution of VA044 (2,2'-Azobis (N,N'-dimethyleneisobutyramidine) dihydrochloride, available from Wako Chemicals USA, Inc., Richmond, Va.). The polymerization is carried out under $N_2$ atmosphere at 35° C. with thorough mixing. After a total reaction time of 6 hours, 2.0 g of a 1% aqueous solution of VA044 is added to the reaction mixture. The reaction mixture is kept at 35° C. overnight. The next day, 2.0 g of a 10% aqueous solution of VA044 is added, and the reaction temperature is maintained for another 2 hours before the reaction mixture is cooled and removed from the reactor. The product of this reaction is a milky white liquid (700 cp., RSV of 33.7 dl/g).

EXAMPLE 2

Preparation of a Representative Drilling Fluid

The polymer of Example 1 is added to water in a dilution tank using a Venturi pump to obtain a polymer concentration of 0.33 lb. per barrel, based on polymer actives. The dilution tank is equipped with a mixer to agitate the solution. After the polymer solution is prepared, bentonite clay, 10 lb. per barrel, is added to the polymer solution to form the drilling fluid.

A comparison of the drilling fluid prepared above with a drilling fluid prepared from a dry anionic polymer of similar composition in a southern European water drilling operation shows that the drilling fluid of this invention does not flocculate bentonite and has a substantially increased useful life compared to a drilling fluid prepared using the corresponding dry polymer.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A method of drilling a well bore through a subterranean formation comprising circulating through the well bore an aqueous drilling fluid having a pH of between about 7 and about 12 and a viscosity of from about 20 to about 80 sec (Marsch cone) which is prepared by admixing fresh water, brine or seawater with about 0.02 lb to about 2.5 lb per barrel, based on polymer actives, of one or more anionic dispersion polymers, wherein the anionic dispersion polymers are composed of about 2 to about 98 mole percent of one or more anionic monomers and from about 98 to about 2 mole percent of one or more nonionic monomers and wherein the anionic dispersion polymers have a RSV of from about 10 to about 50 dL/g.

2. The method of claim 1 wherein the nonionic monomers are selected from the group consisting of acrylamide and methacrylamide.

3. The method of claim 2 wherein the anionic monomers are selected from the group consisting of acrylic acid, methacrylic acid and 2-acrylamido-2-methylpropanesulfonic acid and the salts thereof.

4. The method of claim 2 wherein the dispersion polymer is acrylamide/acrylic acid copolymer.

5. The method of claim 4 wherein the dispersion polymer is composed of from about 2 to about 50 mole percent acrylic acid.

6. The method of claim 2 wherein the drilling fluid comprises fresh water, brine or seawater and contains up to about 10 percent by weight of clay.

7. The method of claim 6 wherein the clay is bentonite.

8. The method of claim 7 wherein the drilling fluid contains from about 4 to about 5 percent by weight of bentonite.

9. The method of claim 2 wherein the well bore is used for recovering oil or gas from subterranean formations.

10. The method of claim 2 wherein the well bore is used for recovering water from subterranean formations.

11. An aqueous drilling fluid used in drilling wells through subterranean formations having a pH of between about 7 and about 12 and a viscosity of from about 20 to about 80 sec (Marsch cone) which is prepared by admixing fresh water, brine or seawater with about 0.02 lb to about 2.5 lb per barrel, based on polymer actives, of one or more anionic dispersion polymers and about 4 to about 5 percent by weight of bentonite, wherein the anionic dispersion polymers are composed of about 2 to about 98 mole percent of one or more anionic monomers and from about 98 to about 2 mole percent of one or more nonionic monomers and wherein the anionic dispersion polymers have a RSV of from about 10 to about 50 dL/g.

12. The drilling fluid of claim 11 further comprising one or more electrolytes, pH adjusting agents, lubricants, bactericides, breakers, iron control agents, foaming agents, gases, liquified gases, proppants, thinners, viscosifiers, weighting agents and shale inhibitors.

* * * * *